(12) United States Patent
Liu et al.

(10) Patent No.: US 8,255,461 B1
(45) Date of Patent: Aug. 28, 2012

(54) EFFICIENT TRANSMISSION OF CHANGING IMAGES USING IMAGE CACHING

(75) Inventors: Guangbing Liu, Sunnyvale, CA (US); Hailei Sheng, Fremont, CA (US); Jiannong Gu, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 644 days.

(21) Appl. No.: 12/399,089

(22) Filed: Mar. 6, 2009

(51) Int. Cl.
*G06F 15/16* (2006.01)
(52) U.S. Cl. ......... 709/204; 709/203; 709/217; 709/219
(58) Field of Classification Search .................. 709/203, 709/217, 219, 204
See application file for complete search history.

(56) References Cited

U.S. PATENT DOCUMENTS

| | | | |
|---|---|---|---|
| 6,108,655 A | 8/2000 | Schleimer et al. |
| 6,181,711 B1 | 1/2001 | Zhang et al. |
| 6,249,787 B1 | 6/2001 | Schleimer et al. |
| 6,295,551 B1 | 9/2001 | Roberts et al. |
| 6,335,990 B1 | 1/2002 | Chen et al. |
| 6,483,543 B1 | 11/2002 | Zhang et al. |
| 6,567,813 B1 | 5/2003 | Zhu et al. |
| 6,597,736 B1 | 7/2003 | Fadel |
| 6,601,087 B1 | 7/2003 | Zhu et al. |
| 6,654,032 B1 | 11/2003 | Zhu et al. |
| 6,691,154 B1 | 2/2004 | Zhu et al. |
| 6,754,693 B1 | 6/2004 | Roberts et al. |
| 6,816,626 B1 | 11/2004 | Fadel |
| 6,891,854 B2 | 5/2005 | Zhang et al. |
| 6,901,448 B2 | 5/2005 | Zhu et al. |
| 6,925,645 B2 | 8/2005 | Zhu et al. |
| 6,948,127 B1 | 9/2005 | Zhu et al. |
| 6,959,042 B1 | 10/2005 | Liu et al. |
| 6,959,044 B1 | 10/2005 | Jin et al. |
| 6,965,646 B1 | 11/2005 | Firestone |
| 7,069,298 B2 | 6/2006 | Zhu et al. |
| 7,096,272 B1 | 8/2006 | Raman |
| 7,130,883 B2 | 10/2006 | Zhu et al. |
| 7,203,755 B2 | 4/2007 | Zhu et al. |
| 7,213,051 B2 | 5/2007 | Zhu et al. |
| 7,216,172 B2 | 5/2007 | Yang et al. |
| 7,353,253 B1 | 4/2008 | Zhao |
| 7,421,469 B1 | 9/2008 | Liu et al. |
| 7,461,347 B2 | 12/2008 | Zhu et al. |
| 7,464,137 B2 | 12/2008 | Zhu et al. |
| 7,471,841 B2 | 12/2008 | Wu et al. |
| 7,477,688 B1 | 1/2009 | Zhang et al. |
| 7,484,115 B2 | 1/2009 | Zhu et al. |
| 7,486,212 B2 | 2/2009 | Chen et al. |
| 7,499,595 B2 | 3/2009 | Chen et al. |
| 7,499,972 B1 | 3/2009 | Buonanno et al. |
| 7,602,981 B2 * | 10/2009 | Niwa et al. ................ 382/239 |
| 7,616,208 B2 * | 11/2009 | Lauder ..................... 345/530 |

(Continued)

*Primary Examiner* — Adnan Mirza

(57) ABSTRACT

In one embodiment, a display of a source device is shared with one or more viewer devices, e.g., of an online collaborative computing session, and the display is divided into a plurality of identified blocks. In response to changes in the display, the source device determines an outer boundary of an updated region affected by the change, where the updated region defines a plurality of "update blocks" of the identified blocks within the outer boundary. Images within each update block may then be compared to a previous version of the corresponding update block to determine if that individual update block is affected by the change. Any unchanged update blocks may be converted to an easily compressible image, and the source device may then compress and transmit the updated region to the viewer devices, where the transmitted updated region has instructions to use previous versions of unchanged converted update blocks.

19 Claims, 7 Drawing Sheets

U.S. PATENT DOCUMENTS

| | | |
|---|---|---|
| 2003/0043923 A1 | 3/2003 | Zhang et al. |
| 2003/0182375 A1 | 9/2003 | Zhu et al. |
| 2005/0004977 A1 | 1/2005 | Roberts et al. |
| 2005/0278635 A1 | 12/2005 | Zhu et al. |
| 2006/0092269 A1 | 5/2006 | Baird et al. |
| 2006/0248144 A1 | 11/2006 | Zhu et al. |
| 2007/0022159 A1 | 1/2007 | Zhu et al. |
| 2007/0150583 A1 | 6/2007 | Asthana et al. |
| 2007/0206091 A1 | 9/2007 | Dunn et al. |
| 2007/0211138 A1 | 9/2007 | Graham et al. |

* cited by examiner

EFFICIENT TRANSMISSION OF CHANGING IMAGES USING IMAGE CACHING

TECHNICAL FIELD

The present disclosure relates generally to computer networks, and, more particularly, to transmission of images through a computer network, such as for online collaborative computing sessions.

BACKGROUND

Collaborative computing sessions, such as interactive conferences (e.g., "web" or "online" conferences/meetings), may be supported by a network of servers and client computers. In particular, one feature available to online meetings or data conferencing systems is to allow computer users at different locations to communicate via a computer network and share applications stored and/or executed on one of the users computers, such as through a software program that enables the users to share applications (e.g., sharing a presenter's application with one or more attendees/viewers).

A conventional technique for sharing applications during a data conference is to share a predefined area of the presenter's computer screen/display with an attendee (e.g., "desktop sharing"). Using this technique, the presenter's computer captures an image within a predefined portion of the presenter's computer screen/display (e.g., the entire screen or a portion of the screen). The captured image within the predefined portion of the presenter's computer screen is then transmitted to the attendee's computer for viewing. Thus, replicas of any windows that are displayed within the predefined portion of the presenter's computer screen are displayed on the attendee's computer screen. A refinement to this conventional technique allows the presenter to selectively share application windows with the attendee (e.g., "application sharing"). Thus, non-shared application windows placed within the predefined portion of the presenter's computer screen may be blocked from the attendees.

Through either technique of sharing displays, however, transmitting the captured images consumes network bandwidth. Various techniques are known in the art to compress image data for transmission through a computer network, but the compressed image data may still consume resources, particularly with poor compression ratios and/or where there are many attendee devices viewing the shared display.

BRIEF DESCRIPTION OF THE DRAWINGS

The embodiments described herein may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, a display of a source device is shared with one or more viewer devices, e.g., of an online collaborative computing session, and the display is divided into a plurality of identified blocks. In response to changes in the display, the source device determines an outer boundary of an updated region affected by the change, where the updated region defines a plurality of "update blocks" of the identified blocks within the outer boundary. Images within each update block may then be compared to a previous version of the corresponding update block to determine if that individual update block is affected by the change. Any unchanged update blocks may be converted to an easily compressible image (e.g., a solid color), and the source device may then compress and transmit the updated region to the viewer devices, where the transmitted updated region has instructions to use previous versions of unchanged converted update blocks.

DESCRIPTION

Figure 1:
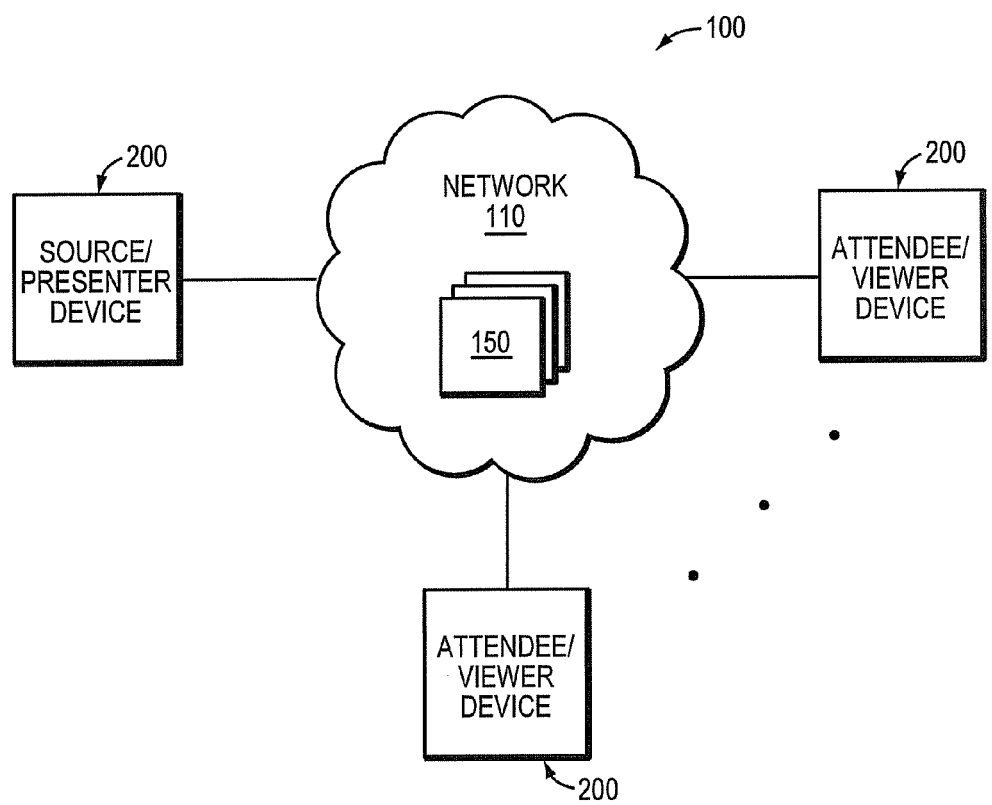
FIG. 1 illustrates an example computer network.

FIG. 1 is a schematic block diagram of an example computer network 100 illustratively comprising nodes/devices, such as one or more participant devices 200 and one or more interaction servers 150 interconnected by links/network 110 as shown and as described further herein. For instance, participant devices, as described below, may be a personal computer (PC) or one or more peripheral devices, such as phones, pagers, etc. Those skilled in the art will understand that any number of nodes, devices, links, etc. may be used in the computer network, and that the view shown herein is for simplicity.

In this environment, a number of participants may interact in an on-line, interactive, or collaborative setting. Such a setting can be for a meeting, training or education, support, or any other event that may require a number of participants to work together, interact, collaborate, or otherwise participate, such as web conferences, on-line meetings, etc. As used herein, the phrase "collaborative computing session" may be used to describe these settings/events, particularly where a number of participant computers/devices collaborate in an established session, as may be appreciated by those skilled in the art. In other words, a collaboration session may comprise a plurality of devices or "participant devices," of which "attendee devices" are configured to view/receive content submitted or "shared" by "presenter devices." In some instances, the attendee devices are capable of modifying the content shared by the presenter device. Also, as used herein, a "session" describes a generally lasting communication between one or more participant devices 200, illustratively (though not necessarily) through the interaction server 150. Those skilled in the art will understand that the session may be implemented/established using protocols and services provided by various layers (e.g., application, session, and/or transport layers) of a network protocol stack according to the well-known OSI model.

In particular, each participant (e.g., hosts/presenters and/or attendees) may operate a participant device 200. Each participant device 200 may comprise an electronic device with capability for visual and/or auditory presentation. Thus, a participant device 200 can be, for example, a desktop personal computer (PC), a laptop computer, a workstation, a personal digital assistant (PDA), a wireless telephone, a smart phone, an Internet television, and the like. Each participant device 200 supports communication by a respective participant, in the form of suitable input device (e.g., keyboard, mouse, stylus, keypad, etc.) and output device (e.g., monitor, display, speech, voice, or other device supporting is the presentation of audible/visual information). Each participant device may be interconnected with a suitable communications network 110 such as, for example, the Internet, and may appear as a client computer thereon.

In one embodiment, each participant device 200 may operate under the control of a suitable operating system (OS) (e.g., WINDOWS, UNIX, etc.) to run software applications (e.g., in the form of code modules) which may be installed, received, or downloaded. At least some of these software applications may support specific functions, such as, for example, functions related to the on-line, interactive meeting (a collaborative computing session), such as conventional web browser programs that allow convenient access and navigation of the Internet (e.g., the World Wide Web).

The on-line collaborative computing session of the various participants may be supported by an interaction server 150 which may be maintained or operated by one or more of the participants and/or a third-party service provider. The interaction server 150 may be a computer system that is connected to network 110, and which may comprise and appear as one or more server computers thereon. Interaction server 150 may store information (e.g., content) and application modules which can be provided to the participant devices 200. In some embodiments, these application modules are downloadable to the participant devices 200 and may support various functions that may be required for an interactive meeting or collaborative effort among the participants. The participant devices 200 and the interaction server 150 may interact in a client/server architecture, which may provide high performance and security for a multi-participant collaborative environment.

Network 110 may comprise or be supported by one or more suitable communication networks, such as, for example, a telecommunications network that allows communication via one or more telecommunications lines/channels. In particular, the communication or data networks, such as the Internet, may be used to deliver content, such as for the collaborative computing sessions herein (or other image transfer application, described below). The Internet is an interconnection of computer clients and servers located throughout the world and exchanging information according to Transmission Control Protocol/Internet Protocol (TCP/IP), Internetwork Packet eXchange/Sequence Packet eXchange (IPX/SPX), AppleTalk, or other suitable protocol. The Internet supports the distributed application known as the "World Wide Web." Web servers maintain websites, each comprising one or more web pages at which information is made available for viewing and audio/hearing. Each website or web page may be supported by documents zo formatted in any suitable conventional markup language (e.g., HTML or XML). Information may be communicated from a web server to a client using a suitable protocol, such as, for example, Hypertext Transfer Protocol (HTTP) or File Transfer Protocol (FTP).

Figure 2:
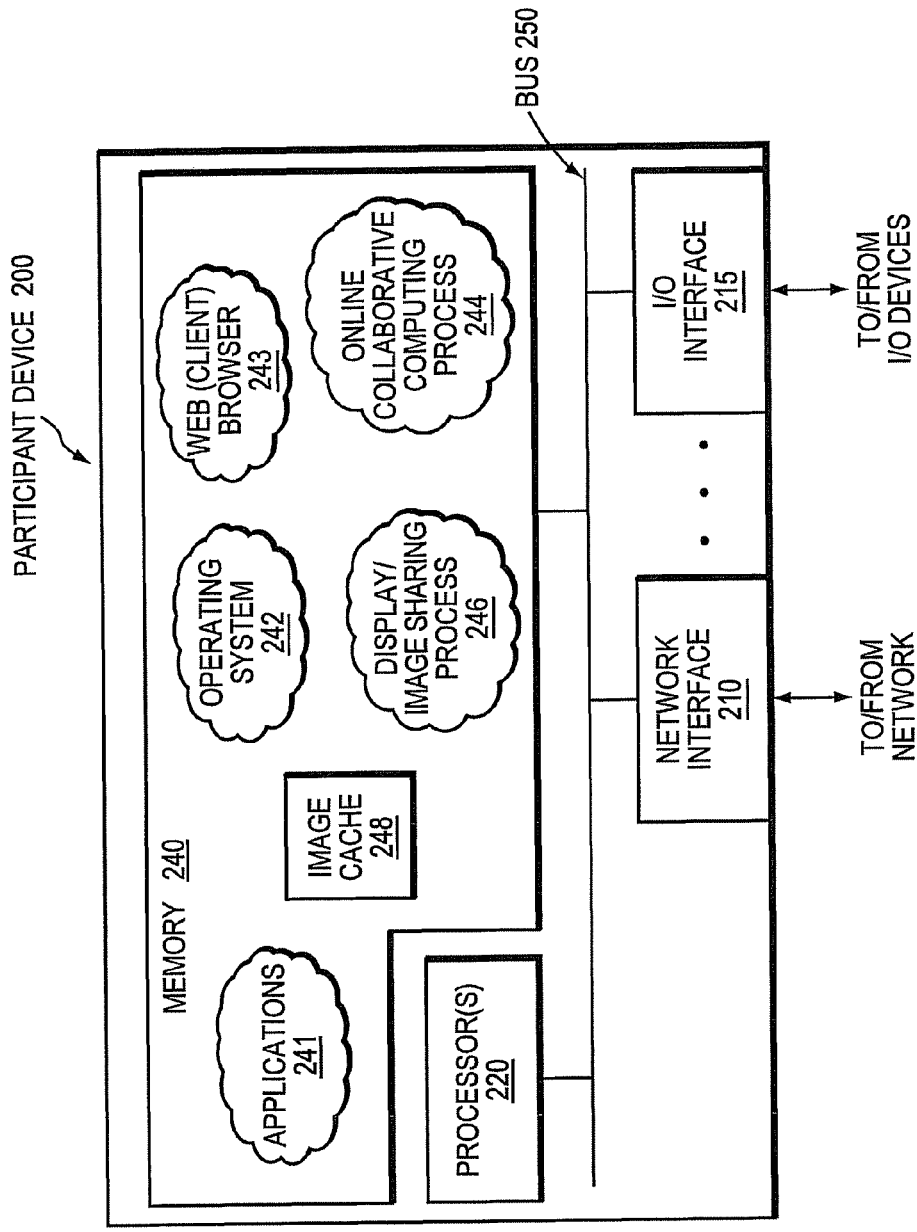
FIG. 2 illustrates an example participant device.

FIG. 2 illustrates a schematic block diagram of an example participant device 200 that may be advantageously used with one or more embodiments described herein, e.g., for collaborative computing. Illustratively, device 200 may be implemented or incorporated in any suitable computer such as, for example, a personal computer (PC), laptop, workstation, personal digital assistant (PDA), smart phone, mainframe, file server, workstation, or other suitable data processing facility supported by storage (either internal, e.g., electronic memory, or external, e.g., magnetic/optical disk), and operating under the control of any suitable OS.

In particular, the device 200 comprises one or more network interfaces 210, one or more input/output (I/O) interfaces 215, one or more processors 220, and a memory 240 interconnected by a system bus 250. The network interfaces 210 contain the mechanical, electrical, and signaling circuitry for communicating data over physical/wireless links coupled to the network 110. The network interface(s) may be configured to transmit and/or receive data using a variety of different communication protocols suitable for the network. Also, I/O interfaces 215 contain the mechanical, electrical, and signaling circuitry for communicating with one or more user interface devices, such as a mouse, keyboard, monitor/screen, etc. (not explicitly shown).

The memory 240 comprises a plurality of storage locations that are addressable by the processor(s) 220 and the network interfaces 210 for storing software programs associated with the embodiments described herein. A portion of the memory may (though need is not) be arranged as a cache (not shown) configured to store one or more data structures and/or code modules associated with embodiments described herein, for example, image cache 248. The processor(s) 220 may comprise necessary elements or logic adapted to execute the software programs and manipulate the data structures. An operating system 242, portions of which are typically resident in memory 240 and executed by the processor(s), functionally organizes the device by, inter alia, invoking operations in support of software processes and/or services executing on the device (e.g., for collaborative computing sessions or other image transfer applications as used herein). In particular, these software processes and/or services may comprise one or more applications 241 (e.g., web browser 243) as understood by those skilled in the art, and, in particular, an online collaborative computing process 244 and a display/image sharing process 246, as described herein. It will be apparent to those skilled in the art that other types of processors and memory, including various computer-readable media, may be used to store and execute program instructions pertaining to the inventive technique described herein.

The online collaborative computing process 244 may contain computer executable instructions executed by the processors 220 to generally perform functions to manage or control various processes or aspects during the course of an online meeting or collaborative computing session in which the participant (user) may interact with other users. For instance, an activity manager may manage meeting-related actions (e.g., starting a session, ending a session, locking a session, etc.), manage participant-related actions (e.g., designating a participant as a session host, assigning a participant the presenter privileges, expelling a participant, establishing participant privileges, etc.), manage session-related actions (e.g., starting a sharing session, closing a sharing session, setting privileges within that sharing session, etc.), and support an interface with the user or participant, and provide a container for embedding one or more application code modules.

Also, a communications component of process 244 may support communication between system 200 and an outside network 110 (e.g., the Internet), such as through network interfaces 210. The communications component thus allows data and information is to be exchanged with or retrieved from other systems or facilities (e.g., participant devices 200 or interaction server 150), for example, during an online meeting or other collaborative computing session. In particular, the communications component may provide a communication platform for any one or more process instances of process 244. For instance, the activity manager may rely on the communications component to establish and maintain the client connection to the interaction server 150 on which the activity session is hosted. Any application code modules (not shown) may also use the established client connection to provide real-time data that is sent and received by each participant.

Various functionality for supporting a collaborative computing session, such as an online meeting, may be provided by the one or more application code modules, generally described herein as being components of the online collaborative computing process 244. These application code modules may be stored/maintained (e.g., by a cache), and may support, for example, basic communication framework, file sharing (e.g., for text, images, video, audio), user authentication, meeting scheduling, address book, files and folders, invoices, billing, scheduling, telephone or video conferencing, authentication, database management, word processing, application sharing, accounting, etc. For example, code modules may comprise (not specifically shown) a text-based chat module, a polling module, a video module, a voice over Internet Protocol (VoIP) module, a questionanswer (QA) module, a file transfer module, a presentation module, an application/desktop view/share module, and an Internet telephony module.

Illustratively, in accordance with one or more embodiments described herein, the display/image viewing/sharing module (shown as process 246) may provide functionality that allows participants to share single applications, multiple applications, portions of a desktop (as understood by those skilled in the art), the entire desktop, or any other defined shared image region. For the participant who is a presenter, the image viewing/sharing module may maintain a list of currently running processes that are located at the user level of the local machine. The image viewing/sharing module 246 may allow selection of one or more participants with which to share the content of those running processes. In one embodiment, e.g., through a complex kernel driver or screen capturing technology, the image viewing/sharing module 246 captures Graphics Device Interface (GDI) calls made from the applications to the system, convert and encode the data, and unicast the data to the other participants (viewers), e.g., via the interaction server 150. For each participant that receives the data, the image viewing/sharing module 246 may decode the received data and display the content.

In particular, conventional application/display sharing techniques capture a predefined portion of the presenter's computer screen (e.g., the entire screen or a rectangle within the entire screen) and provide the image within the predefined portion of the presenter's computer screen to the viewer (e.g., "desktop sharing"). All of the applications that have windows positioned within the predefined portion of the presenter's computer screen are captured by the presenter's computer, transmitted to the viewer's computer, and displayed on the viewer's computer screen. By using "application sharing," however, a presenter may share or not share particular application windows. (Note that references to a window are directed to an area utilized to display the content, and references to a desktop are directed to an entire portion of a display area of a corresponding device.)

Other image sharing techniques may also be used between a presenter device (which need not be associated with a user operator) and one or more viewer devices. For example, video streams, slide shows, presentations, etc., may be distributed from a presenter device, e.g., a server, to the viewer devices. As noted, however, transmitting captured images from a presenter device to viewer devices, regardless of the image sharing scheme used, consumes network bandwidth. Various techniques are known in the art to compress image data for transmission through a computer network (e.g., JPEG, MPEG, etc.), but the compressed image data may still consume resources, particularly with poor compression ratios and/or where there are many attendee devices viewing the shared disco play.

Efficient Transmission of Shared and Changing Image Data

Generally, in an image/display sharing session, each raw frame of data is the difference between the present image and the previous image. According to embodiments described herein, to reduce the amount (or size) of data being transmitted through the network, a cache mechanism is used to take advantage of the preceding transmitted image data. In addition, a tile based image transmission may be utilized with relatively smaller block (tile) sizes, thus increasing the cache hit rate and generating a generally better compression ratio. As described below, when a source device generates a next changed display, individual tiles/blocks are compared to previous (cached) versions, and if the block is unchanged, then that block is filled with some easily compressible pattern (e.g., a solid color) before transmission, and the viewer device is instructed to use their correspondingly cached version of the block instead.

In other words, it is often the case that certain image tiles/blocks in a fixed area of a shared changing image (e.g., for shared desktops/applications of online collaborative computing sessions) have not changed since a last captured image. As such, by managing the unchanged image blocks (e.g., in a cache list), and illustratively filling (replacing) the unchanged block with a special color (e.g., black or white), the compressed size of the transmitted image data may be reduced. The viewer devices may then be instructed to use the specified image cache data from the previous image to show the cached image in that block position (e.g., in place of the special color or an untransmitted block).

Illustratively, certain techniques described herein (e.g., the image sharing and caching) may be performed by a presenter or viewer device 200 (or interaction server 150 if so configured) through image/display sharing application 246 (e.g., and/or online collaborative computing process 244). In particular, these processes and/or services may be configured to operate on a device 200 in accordance with certain techniques as described herein, depending upon whether the images (e.g., viewable shared application windows or desktops) for transmission to viewer/attendee devices are being rendered by the presenter device (or server) or being received by a viewer device.

Operationally, a presenter device and one or more viewer devices 200 may participate in an image/display sharing session, such as in accordance with an online collaborative computing session as described in detail above. In particular, the display of a source device (presenter, server, etc.) may be shared by capturing images from the source device and transmitting those images to the viewer device(s) according to the techniques described herein. For instance, one technique that may be used is to define a shared region, capture an image (e.g., bitmap) within that shared region, and transmit the captured image to the viewer devices.

Figure 3:
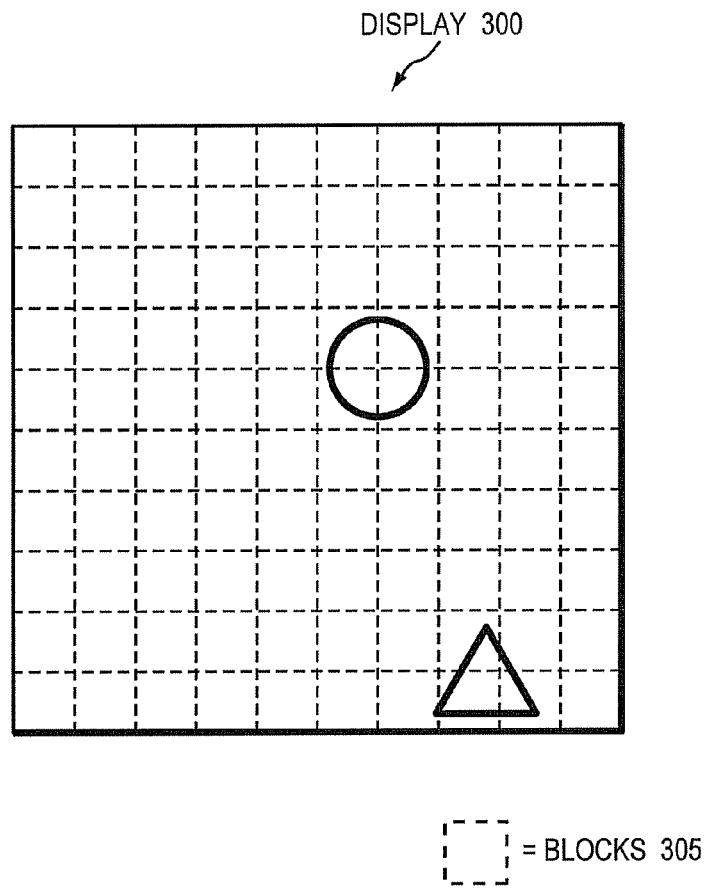
FIG. 3 illustrates an example display with identified block.

In one embodiment, a tile-based caching of images may be used, e.g., where the display/image to be shared and transmitted is divided into a plurality of tiles or "blocks," each with its own identification. FIG. 3 illustrates an example display 300 composed of a plurality of tiles/blocks 305 that are generally fixed in size (e.g., width and height) and location. Those skilled in the art will appreciate that while the identified blocks are rectangular in nature (e.g., having a pixel size of 160×120 or, illustratively, 64×64), other shapes and sizes are equally applicable to the techniques described herein (e.g., triangles, hexagons, or other shapes such that the entire area of the shared image is covered by an identified block). For instance, the blocks (e.g., grid) may be calculated based on the shared display size and the size/shape of the blocks.

According to the embodiments described herein, the image generated within each individual block 305 may be stored by the source (e.g., presenter) device, such as in an image cache 248. Image cache 248 may be addressable by the corresponding block's identification (ID) or by a separate (or additional) cache ID. The viewer devices may also store the images received for each individual shared block 305, and utilizes a cache 248 being addressed in the same manner as the source device.

As an example, the source device may initially generate the display 300, and may store each individual block's image in cache 248. Alternatively, the source device may compute a checksum or hash (e.g., using the known MD5 algorithm) for each block's image, and store only (or additionally) the checksum, described below. The initial display 300 may be transmitted to the one or more viewer devices, illustratively after being compressed by a conventional compression algorithm (e.g., from a Bitmap to a JPEG, MPEG, etc., as will be understood by those skilled in the art). In addition, the source device may include identifications of the blocks (or the algorithm used to determine the blocks and IDs) in order to ensure that the source and viewer devices have conforming blocks and IDs (for use described below).

The viewer devices may then receive the shared display 300, decompress it, and output the shared display 300 (e.g., on a monitor/screen, not shown, via I/O interfaces 215). The viewer devices also store/cache the individual blocks' images in cache 248 zo along with their IDs. (Note that the viewer devices need not store checksum values as described below.)

Once the presenter's display 300 changes, e.g., adding a object, selecting a new window, drawing, typing, etc., the display/image sharing process 246 determines an "updated region" of the display 300, which may be defined by an outer boundary. The outer boundary (and corresponding update region) may be a specific region that is tightly sized to fit outermost changed pixels of the changed display, or, alternatively, an outer boundary of whole blocks that include changed pixels (bits). In particular, by monitoring the shared image for pixel changes, an outer boundary corresponding to that specific region (e.g., due to rectangular bitmap transmissions, as will be appreciated by those skilled in the art) may be defined.

Figure 4:
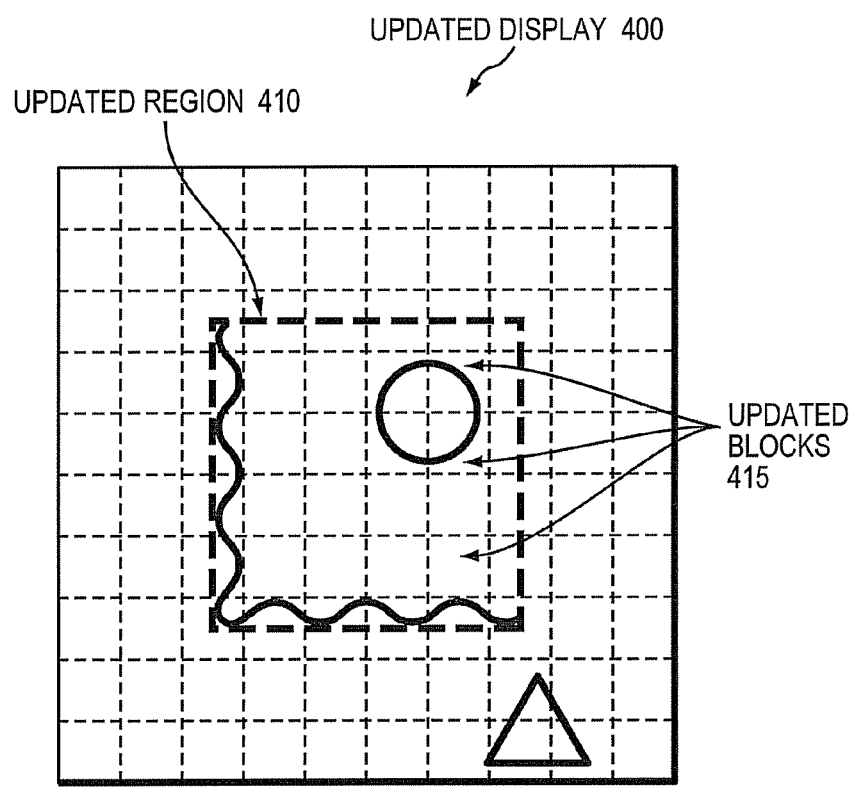
FIG. 4 illustrates an example updated display and update region.

For example, FIG. 4 illustrates an updated display 400 showing a newly added object (the curvy "L"). Based on the operation of display/image sharing process 246, update region 410 may be determined using various techniques, whose result may be: a) a rectangular region having a maximum "x" and "y" range based on the outer-most changed pixels in each direction (e.g., pixels x1–x2 by y1–y2); b) a region having a maximum outer boundary block range based on the outer-most affected blocks in each direction (e.g., all the blocks having any pixels in the range from x1–x2 by y1–y2); c) a regular or irregular polygon having outer boundary blocks that are only affected by the change (e.g., the blocks directly impacted by the changed "L" character in FIG. 4); or d) the entire display 400.

Based on the updated region and corresponding outer boundary blocks, the source device may also determine the set of blocks that are included within the region, hereinafter "update blocks" 415. For example, according to the illustrative embodiment, the update region 410 includes an outer boundary in a rectangular region and all whole and surrounded blocks as update blocks 415 (note that in the alternative, the update blocks may comprise all blocks that are part of the update region, and not only the whole/complete blocks). Each of the update blocks 415 may then be compared to a previous version (e.g., in cache 248) to determine whether there are any changes that affected each individual block. For instance, a checksum/hash may be computed of each update block and compared to a stored checksum value (as noted above) to determine whether the checksums differ.

Figure 5:
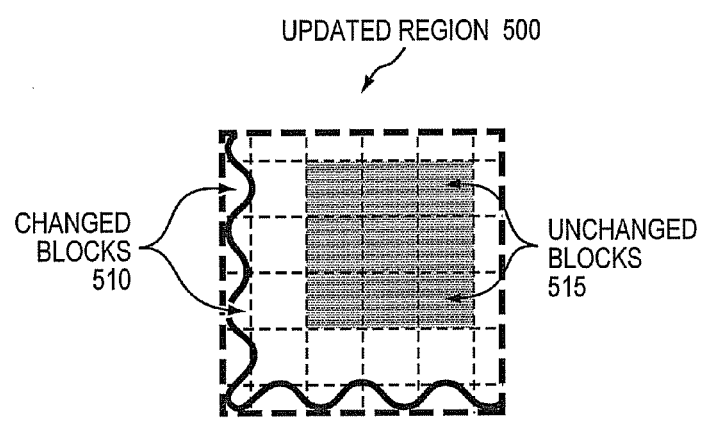
FIG. 5 illustrates an example update region showing changed blocks.

As shown in the example updated region 500 in FIG. 5, different or changed blocks 510 are shown having the new curvy "L" design, while non-different or unchanged blocks 515 are shown that are not affected by the change. Specifically, the unchanged blocks 515 may be removed from the updated region 500, and replaced with (converted to) a solid color or other easily compressible image. For instance, the source device (display/image sharing process 246) may fill in the unchanged blocks with a solid white or black color, or a bit representation of all 1s or all 0s, or other easily compressible color or bit pattern (or color pattern). Accordingly, when compressing the adjusted updated region 500, a smaller data size typically results from the greater compression ratio that may be achieved as compared to the original update region 410 of FIG. 4, as will be understood by those skilled in the art. (Note that the changed updated blocks 510 and/or their checksums may also be stored (e.g., in cache 248) for comparison with later changes to the display as a "previous version," accordingly.)

The updated region 500 (e.g., the compressed version thereof) may then be transmitted by the source device to the one or more viewer devices. In particular, according to one or more embodiments described herein, the transmission includes the update blocks 510 that are different than their previous version and instructions to use previous versions of update blocks 515 that are not different from their previous versions. Illustratively, the instructions may indicate the one or more block identifications of the unchanged update blocks 515 (e.g., a cache ID), such as in a list form appended to the transmitted image data. Conversely, the instructions may simply be a specified code in the converted unchanged update blocks 515 that indicates where the converted blocks are located. For instance, simply filling the blocks with the solid color yellow, or perhaps an easily compressible non-colored bit pattern, for example, may indicate to the receiving viewer devices where the converted/unchanged blocks 515 are located. (Note that in certain embodiments where the update region 410 may be smaller than whole outer boundary blocks, the outer boundary blocks may not be considered update blocks 415 for the purpose of comparison, and in such embodiments may not be converted for compression or transmission.)

The one or more viewer devices may receive the transmitted updated region, and may decompress the data and examine it to discover the updated region (notably having a specific and defined location within the shared display), the changed/different update blocks 510, and instructions to use previous (cached) versions of unchanged/non-different update blocks 515, as described above. As such, the viewer devices (e.g., display/image sharing process 246) may replace portions of its current display with the updated region by using the received image (including changed update blocks 510 in their respective locations), and previous (locally stored) versions of the unchanged update blocks 515 according to the instructions. (Also, the viewer devices may correspondingly store the changed/different update blocks locally in cache 248 for future use.)

Figure 6:
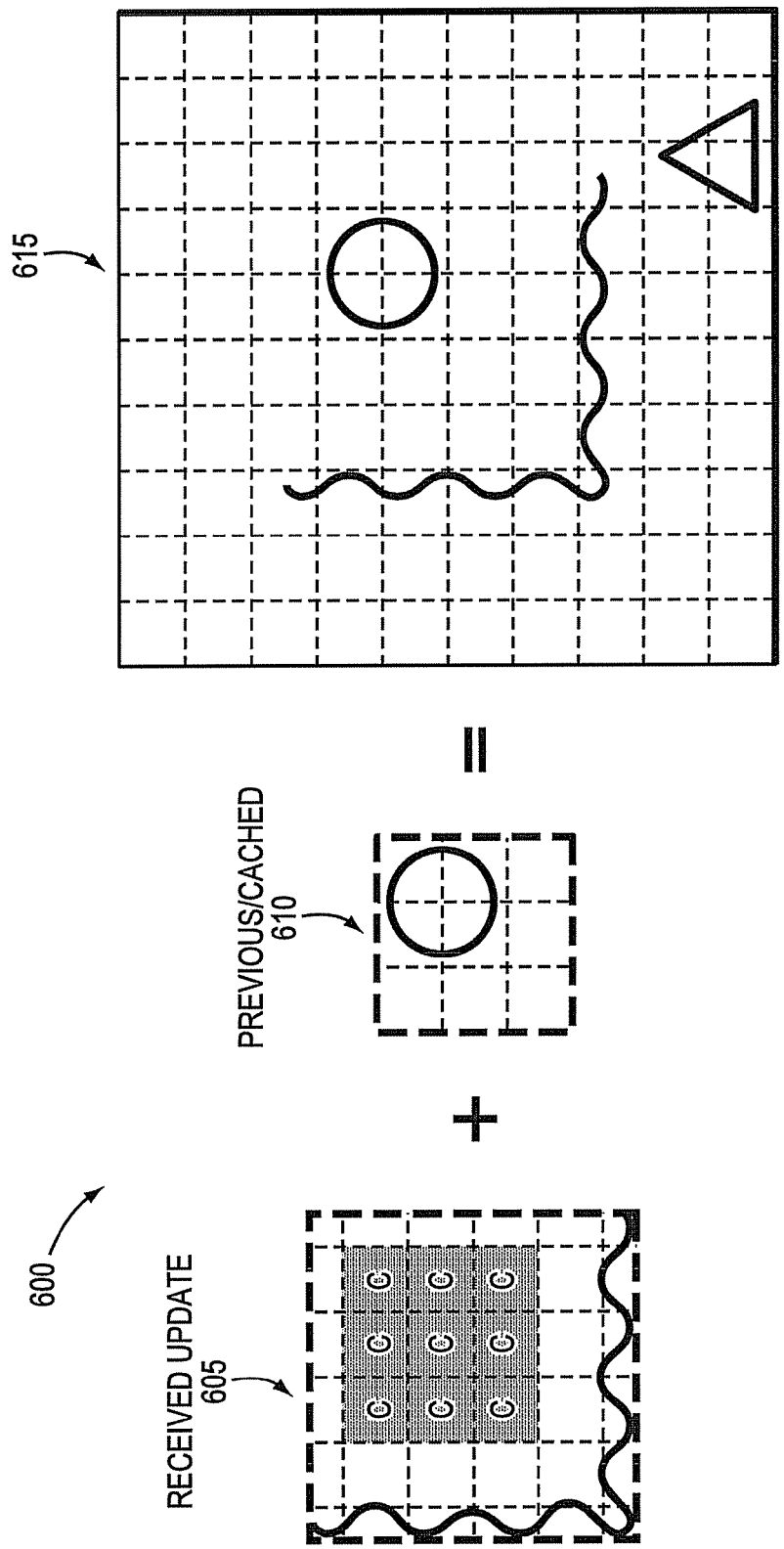
FIG. 6 illustrates an example transmitted update region and cached blocks and resulting display.

For example, FIG. 6 illustrates the technique used by the viewer devices as mentinned above. In particular, the updated region as received (indicated as "605") contains the changed update blocks (showing the curvy "L"), and either a solid color or other bit pattern within the non-changed update blocks (shown with the letter "C"). Based on the included instructions, the viewer device is directed to use previous versions of the non-changed update blocks (indicated as "610") in place of the solid colored (or otherwise) blocks that were used to increase compression rates. The end result is a full display 615 that shows the original blocks not affected by the received update region at all (e.g., the triangle shown), the newly changed blocks (showing the curvy "L"), and the original blocks not changed, but found within the received update region (e.g., the circle). Accordingly, the display 615 should now match that of the source/presenter device, and the is blocks as shown in display 615 should each be stored as the most recent copy (or "previous version") of the image for the next received data update from the source device.

Figure 7:
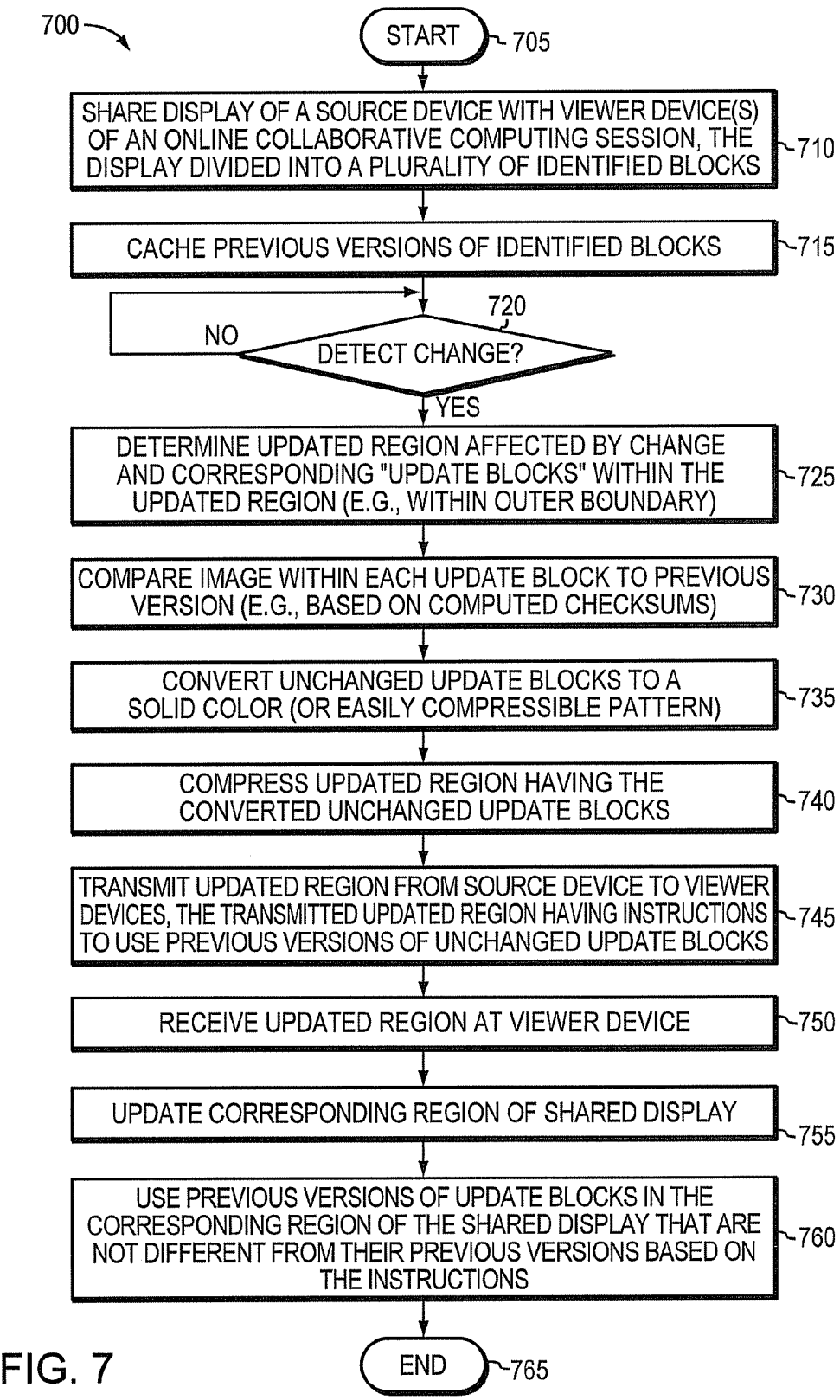
FIG. 7 illustrates an example procedure for efficiently transmitting changing image data.

FIG. 7 illustrates an example procedure for efficiently transmitting changing image data in accordance with one or more embodiments described above. The procedure 700 starts at step 705, and continues to step 710, where a source device shares its display 300 with one or more viewer devices of an online collaborative computing session. As described above, the display is divided into a plurality of identified blocks 305, and previous versions of the blocks may be cached (e.g., in cache 248) in step 715.

In response to a change in the image/display in step 720, the source device may determine, in step 725, the updated region 410 affected by change and corresponding "update blocks" 415 within the updated region (e.g., within an outer boundary or outer boundary blocks). Once the updated region is determined, the source device in step 730 may compare image data within each update block to the cached previous version to determine whether any changes have occurred to that specific update block. For example, as mentioned above, the cached previous version may simply be a checksum of the actual previous image, and a new checksum may be computed for the update block and compared accordingly to detect the difference.

For those non-different (unchanged) update blocks, the source device may convert the image in those blocks to a solid color or other easily compressible pattern in step 735, such that in step 740 the compressed updated region (with converted non-different update blocks) is generally more greatly compressed than if the non-different update blocks had not been converted. Accordingly, in step 745, the present device may transmit the compressed updated region to the viewer devices with the updated image (e.g., blocks that are different than their previous version) and instructions to use previous versions of non-different (converted unchanged) update blocks (e.g., using block IDs, specific colors or patterns, etc.).

Upon receiving the updated region in step 750, a viewer device may update a corresponding region of the shared display (on the viewer device) in step 755 with the changed portion of the update region, while in step 760 utilizing previous versions of update blocks that are not different from their previous versions based on the instructions (e.g., cached or unchanged). The procedure 700 ends in step 765, notably with the option of returning to step 705 to continue the process of sharing a display and transmitting image data according to the techniques described herein.

Notably, one or more embodiments merely store the most recent copy of the image for each individual block, thus storing the images by the identification of the corresponding block 305. However, more advanced embodiments may store a plurality of recent image copies for each individual block, thus storing the images by a separate (or additional) new cache ID. As such, rather than simply comparing the current image to the immediately previous image, the source device may locate an earlier cached copy that is the same (e.g., where an image changes from a first design to a second design, and then back to the first design). Accordingly, the instructions may include the particular cache ID for the viewer device to display, rather than simply instructions to use the immediately previous image.

Advantageously, the novel techniques described herein efficiently transmit changing image data in a computer network. By converting unchanged update blocks of an update region for compression, the novel techniques allow for a reduction in data transmission size, thus saving network resources. In particular, use of a small block size may improve cache hit rate, and keeps raw data intact to achieve a good compression ratio. In addition, by reducing the data transmission size to reduce the number of packets through the network, fewer packets may be lost/dropped in the network, resulting in a higher quality image sharing experience for users.

While there have been shown and described illustrative embodiments that efficiently transmit changing image data in a computer network, it is to be understood that various other adaptations and modifications may be made within the spirit and scope of the present invention. For example, the embodiments have been shown and described herein for use with web browser-based applications, such as online conference meeting sites. However, the embodiments of the invention in their broader sense are not so limited, and may, in fact, be used with other applications/sessions, as may be appreciated by those skilled in the art. In particular, while the embodiments have been described with reference to online collaborative computing sessions and presenter devices as the source device, it is to be understood that any other image transmission application (e.g., Video over IP) may equally make use of the techniques herein, for example, where cache hit rates would remain high and effective based on the expected changes of the images.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:

sharing a display of a source device with one or more viewer devices, the display divided into a plurality of identified blocks;

in response to changes in the display, determining an outer boundary of an updated region affected by the change, the updated region defining a plurality of update blocks of the identified blocks within the outer boundary;

comparing an image within each update block to a previous version of the corresponding update block to determine whether the block is changed or unchanged;

converting the image within unchanged update blocks to a different easily compressible image;
compressing the updated region having the converted unchanged update blocks; and
transmitting the compressed updated region from the source device to the one or more viewer devices, wherein the transmitted updated region is transmitted with instructions indicating converted unchanged update blocks within the transmitted update region and with instructions for the one or more viewer devices to use previous unconverted versions of the identified unchanged update blocks to replace the corresponding converted unchanged update blocks in the transmitted updated region to produce the shared display.

2. The method as in claim 1, wherein converting comprises: converting the unchanged update blocks to a solid color.

3. The method as in claim 2, wherein the solid color is one of either black or white.

4. The method as in claim 1, wherein the easily compressible image is represented in bit form as one of either all 1s or all 0s.

5. The method as in claim 1, wherein comparing comprises:
computing a checksum of the image within each update block; and
comparing the computed checksum to a computed checksum for the previous version of the corresponding update block.

6. The method as in claim 1, further comprising:
caching previous versions of identified blocks at the source device for comparison.

7. The method as in claim 1, further comprising:
caching previous versions of identified blocks at the viewer devices for use in response to the instructions.

8. The method as in claim 7, further comprising:
receiving instructions at one of the viewer devices to use cached versions of identified blocks that correspond to converted unchanged update blocks within the transmitted updated region; and using the cached versions of identified blocks according to the instructions.

9. The method as in claim 1, further comprising:
indicating, by the instructions, one or more block identifications corresponding to the converted unchanged update blocks.

10. The method as in claim 1, further comprising:
indicating, by the instructions, the converted unchanged update blocks according to a specified code within the converted unchanged update blocks transmitted in the updated region.

11. The method as in claim 10, wherein the specified code is one of either a specified solid color or a specified bit pattern.

12. The method as in claim 1, wherein the identified blocks are rectangular.

13. The method as in claim 12, wherein the identified blocks have a pixel size of one of either 160×120 or 64×64.

14. The method as in claim 1, wherein the updated region is rectangular.

15. The method as in claim 14, wherein the outer boundary and corresponding updated region are tightly sized to fit outermost changed pixels of the changed display.

16. The method as in claim 1, wherein the transmitted updated region is a bitmap image.

17. Non-transitory tangible computer-readable media of a memory device having software encoded thereon, the software when executed on a device operable to:
share a display of the device with one or more viewer devices, the display divided into a plurality of identified blocks;
in response to changes in the display, determine an outer boundary of an updated region affected by the change, the updated region defining a plurality of update blocks of the identified blocks within the outer boundary;
compare an image within each update block to a previous version of the corresponding update block to determine whether the block is changed or unchanged;
convert the image within unchanged update blocks to a different easily compressible image;
compress the updated region having the converted unchanged update blocks; and
transmit the compressed updated region to the one or more viewer devices, wherein the transmitted updated region is transmitted with instructions indicating converted unchanged update blocks within the transmitted update region and with instructions for the one or more viewer devices to use previous unconverted versions of the identified unchanged update blocks to replace the corresponding converted unchanged update blocks in the transmitted updated region to produce the shared display.

18. The computer-readable media as in claim 17, wherein the easily compressible image is selected from a group consisting of: a solid color, black, white, a representation in bit form as all 1s, and a representation in bit form as all 0s.

19. An apparatus, comprising:
a display configured to display images;
a network interface configured to transmit and receive data over a computer network;
a processor configured to execute processes; and
a memory configured to store previous versions of update blocks, the memory further configured to store an image sharing process, the image sharing process when executed by the processor operable to:
share the display with one or more viewer devices, the display divided into a plurality of identified blocks;
in response to changes in the display, determine an outer boundary of an updated region affected by the change, the updated region defining a plurality of update blocks of the identified blocks within the outer boundary;
compare an image within each update block to a previous version of the corresponding update block to determine whether the block is changed or unchanged;
convert the image within unchanged update blocks to a different easily compressible image;
compress the updated region having the converted unchanged update blocks; and
transmit the compressed updated region to the one or more viewer devices, wherein the transmitted updated region is transmitted with instructions indicating converted unchanged update blocks within the transmitted update region and with instructions for the one or more viewer devices to use previous unconverted versions of the identified unchanged update blocks to replace the corresponding converted unchanged update blocks in the transmitted updated region to produce the shared display.

* * * * *